United States Patent [19]

Ueno et al.

[11] 4,177,237
[45] Dec. 4, 1979

[54] METHOD OF MOLDING SOCKET OF PLASTIC RESIN TUBE

[75] Inventors: Yoshio Ueno; Takeshi Ikeda, both of Hiratsuka; Masaru Isozaki, Kanagawa, all of Japan

[73] Assignee: Mitsubishi Plastics Industries Limited, Tokyo, Japan

[21] Appl. No.: 827,260

[22] Filed: Aug. 24, 1977

[30] Foreign Application Priority Data

Nov. 24, 1976 [JP] Japan ................................. 51-141034

[51] Int. Cl.² ............................................. B29D 23/00
[52] U.S. Cl. .................................... 264/296; 264/322; 425/DIG. 218
[58] Field of Search ............................. 264/296, 322; 425/DIG. 218

[56] References Cited

U.S. PATENT DOCUMENTS 3,899,565  8/1975  De Putter ........................... 264/296

*Primary Examiner*—Thomas P. Pavelko
*Attorney, Agent, or Firm*—Oblon, Fisher, Spivak, McClelland & Maier

[57] ABSTRACT

A socket is molded at the edge of a plastic resin tube with a male mold and a female mold wherein the male mold comprises a large diameter part, a tapered part and a small diameter part and the female mold comprises a barrel for surrounding the male mold small diameter part with a gap larger than the thickness of the resin tube and a split stopper for closing the opening of the annular space formed between the male mold small diameter part and barrel. In the operation, the edge of the resin tube is heated to soften it and it is outwardly fitted on the male mold small diameter part and the stopper is contacted at the boundary part between the male mold small diameter part and the tapered part, or on the small diameter part near the boundary, and the barrel is connected to the split stopper to dispose it about the outer part of the male mold small diameter part, and the resin tube is pushed to the direction of the male mold large diameter part to fill the edge of the resin tube in the annular space formed by the male mold small diameter part and the barrel and the stopper so as to increase the thickness, and the barrel connected with the split stopper which is radially opened and the resin tube is pushed to the direction of the large diameter part so as to outwardly fit the edge of the resin tube having the thickness increased part on the male mold large diameter part.

In the other embodiment, the barrel is not split and can be contacted with the split stopper. In this case, after increasing the thickness of the resin tube, the stopper is taken out from the male mold by radially opening it and the barrel is taken out to the direction of the male mold large diameter part.

4 Claims, 14 Drawing Figures

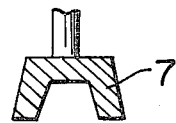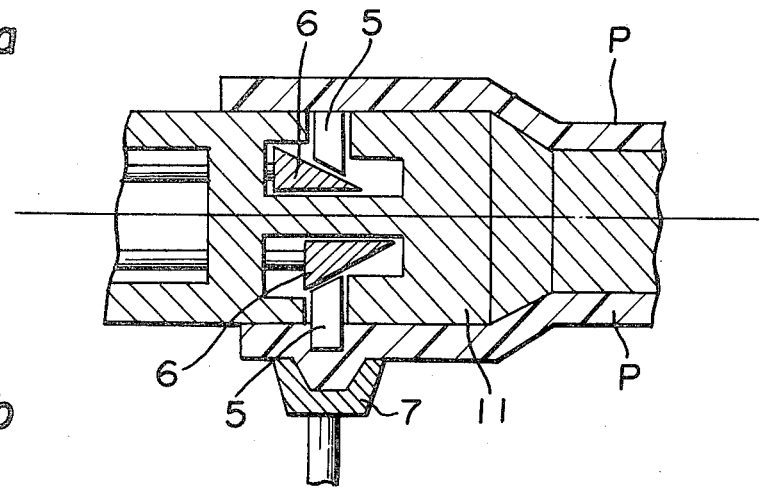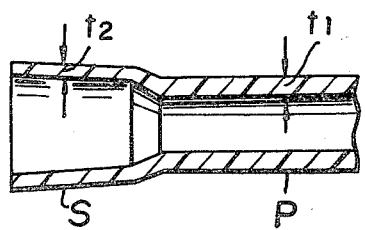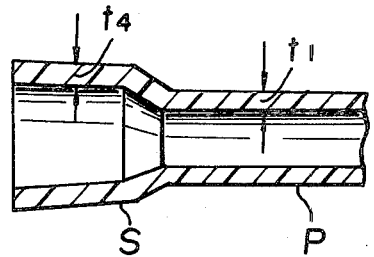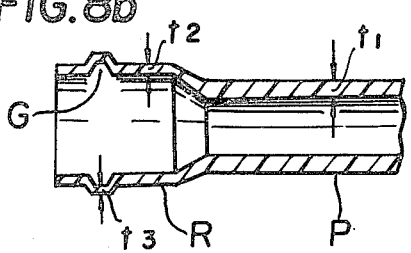

METHOD OF MOLDING SOCKET OF PLASTIC RESIN TUBE

BACKGROUND OF THE INVENTION

1. Field of the Invention

The present invention relates to a method of molding a socket for a joint by expanding the edge of a plastic resin tube.

2. Description of the Prior Art

When a plastic resin tube, especially a rigid polyvinyl chloride tube is jointed, the edge of the resin tube has been expanded by using a mold so as to form socket.

The shapes of the socket have been the socket S having slight tapered inner surface as shown in FIG. 8(a). (hereinafter referring to as a TS socket); a socket having annular groove G in circumferencial direction so as to fit the annular packing as shown in FIG. 8(b) (hereinafter referring to as RR socket).

The thickness $t_2$ of the socket or the thickness $t_3$ of the groove G become smaller than the thickness $t_1$ of the resin tube P whereby the pressure resistance and impact strength of the part are disadvantageously lowered.

It has been known that the thickness of the socket is increased by pushing the edge of the resin tube to the axial direction when the socket is molded by expanding the diameter of the edge of the resin tube. However, in the conventional method, the resin tube is pushed between the male mold for expanding the diameter which has the outer diameter larger than the inner diameter of the resin tube P, and the female mold surrounding the tube with the space larger than the thickness $t_1$ of the tube, whereby the thickness increasing work and the diameter expanding work are simultaneously carried out. Accordingly the male mold and the female mold should be taken out to different direction after molding the socket.

Accordingly, the removal of the female mold has not been easy depending upon the length of the resin tube. Moreover, the movements of the resin tube and the molds are complicated whereby the continuous molding operation could not be attained.

SUMMARY OF THE INVENTION

It is an object of the present invention to overcome the above-mentioned disadvantages of the conventional method.

It is another object of the present invention to provide a method of molding a socket with the thickness increasing work which is sequentially carried out in one apparatus so as to improve continuous moldability.

It is the other object of the present invention to overcome the disadvantage of the formation of non-flat edge of the socket which is caused by sequential operations for the thickness increasing work and the diameter expanding work.

The foregoing and other objects of the present invention can be attained by the method of molding a socket of a plastic resin tube which comprises (a) heating the edge of the resin tube to soften it and fitting it outwardly on a male mold small diameter part; (b) contacting a stopper of a female mold at the boundary of the small diameter part and a tapered part or on the small diameter part near the boundary and disposing a barrel and the stopper of the female mold at outer part of the male mold small diameter part; (c) pushing the resin tube to the direction of the male mold large diameter part and filing the edge of the resin tube in an annular space formed by the male mold small diameter part, the barrel and the stopper to increase the thickness of the edge; (d) removing the barrel and the stopper from the male mold; and (e) pushing the resin tube to the direction of the male mold large diameter part whereby the edge of the resin tube having the thickness increased part is outwardly fitted on the male mold large diameter part to expand the inner diameter of the edge.

BRIEF DESCRIPTION OF THE DRAWINGS

Various other objects, features and attendant advantages of the present invention will be more fully appareciated as the same becomes better understood from the following detailed description when considered in connection with the accompanying drawings, wherein like reference characters designate like or corresponding parts throughout the several views, and wherein:

FIGS. 1 to 5 are sectional views for showing one embodiment of the method of molding the TS socket according to the present invention wherein FIG. 1 shows the condition before the initiation of the molding; FIG. 2 shows the condition at the initiation of the molding; FIG. 3 shows the condition after the thickness increasing work; FIG. 4 is the condition at the preparation for the diameter expanding work after the thickness increasing work; and FIG. 5 is the condition at the finish of the diameter expanding work.

FIG. 7 is a sectional view for showing the embodiment for molding the RR socket;

FIGS. 8 (a), (b) and (c) are sectional views of the sockets wherein (a) a conventional TS socket, (b) a conventional RR socket and (c) the TS socket are obtained by the method of the present invention;

DETAILED DESCRIPTION OF THE PREFERRED EMBODIMENTS

Figure 1:
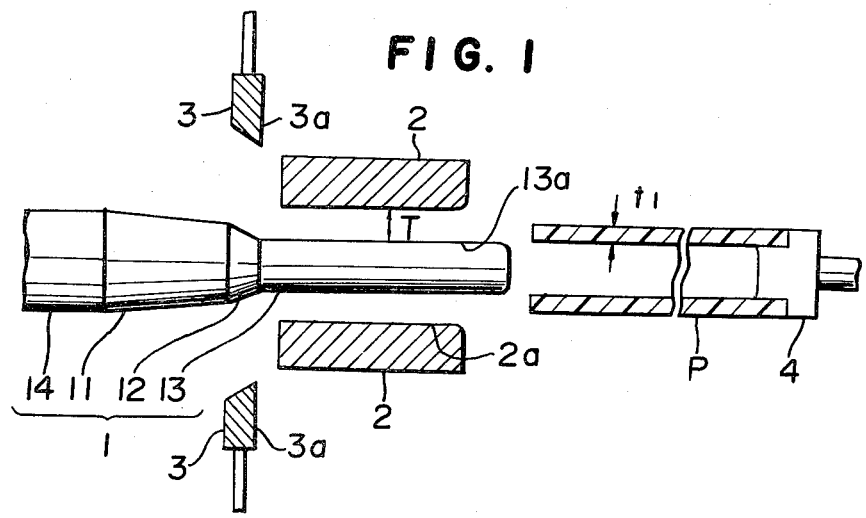

Referring to the drawings, the present invention will be illustrated in detail.

FIG. 1 is a sectional view showing the condition before the preparation of the socket when the method of the present invention is applied for the preparation of a TS socket.

In FIG. 1, a male mold (1) comprises a large diameter part (11), a tapered part (12) and a small diameter part (13) which are held by a base (14) in one side. The small diameter part (13) is used to cause thickness increasing work and has a diameter substantially the same as the inner diameter of a resin tube P. The tapered part (12) and the large diameter part (11) are used to cause diameter expanding work. The tapered part (12) is used to smoothly expand the resin tube from the size of the small diameter part (13) to the size of the large diameter part (11). The large diameter part (11) is used to expand the diameter of the resin tube, and has the outer shape corresponding to the inner surface shape of the TS socket S, that is, it has slight tapered outer surface to the tapered part (12). The taper of the large diameter part is designed to about 1/30 to 1/50 of the difference of diameters to length in accordance with the Standard for TS socket.

The female mold corresponding to the male mold (1) comprises a barrel (2) and a stopper (3). The female mold controls the shape of the thickness increased part by surrounding the resin tube in the thickness increasing work. The barrel (2) controls the outer surface of the thickness increased part and the stopper (3) controls the edge surface thereof.

The barrel (2) is a one piece cylinder and the gap T between the inner surface (2a) of the barrel and the outer surface (13a) of the male small diameter part (13) is greater than the thickness $t_1$ of the resin tube P. (such as 30% larger than $t_1$). The stopper (3) is a cylinder having a divided structure and one side surface of the stopper is the stopper surface (3a) for closing the opening of the annular space formed between the male small diameter part and the barrel.

In the condition fastening the stopper (3) on the male tapered part (12), the inner edge of the stopper surface (3a) is closely contacted with the male mold (boundary between the tapered part (12) and the small diameter part (13) of the male mold or on the small diameter part (13) near the boundary), and the stopper surface (3a) is substantially perpendicular to the axis of the male mold (1).

The barrel (2) can be shifted to the axial direction of the male mold (1) and the stopper (3) can fasten and open in the radial direction of the male mold (1).

A pushing device (4) holds the worked resin tube P and pushes it into the mold. In the molding of the TS socket, the barrel (2) is disposed at an outer position of the male mold small diameter part (13) to fasten the stopper (3) on the male mold tapered part (12).

Figure 2:
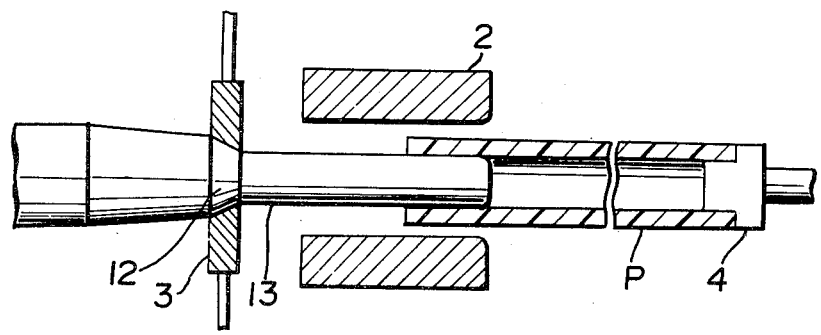

The edge of the resin tube P is heated to the temperature suitable for softening it, such as about 120° C. for rigid polyvinyl chloride, and it is outwardly fitted to middle of the male mold small diameter part (13). The condition is shown in FIG. 2. In the condition, the resin tube P is pushed to the stopper (3) and the barrel (2) is simultaneously shifted toward the stopper (3) (preferably at the velocity slower than that of the resin tube P), to contact it to the stopper (3) whereby an annular space is formed by the outer surface (13a) of the male mold small diameter part and the surface (3a) of the stopper and the inner surface (2a) of the barrel. The edge of the resin tube P is filled into the space. The condition is shown in FIG. 3.

The gap T between the outer surface (13a) of the male mold small diameter part and the inner surface (2a) of the barrel is larger than the thickness $t_1$ of the resin tube P whereby the thickness of the edge of the resin tube P is increased to about T.

During the thickness increasing work, the male mold (1) and the barrel (2) are heated to a suitable temperature. The temperature is preferably about 60° to 70° C. for the male mold and about 90° to 100° C. for the female mold in the case of the rigid polyvinyl chloride.

Figure 3:
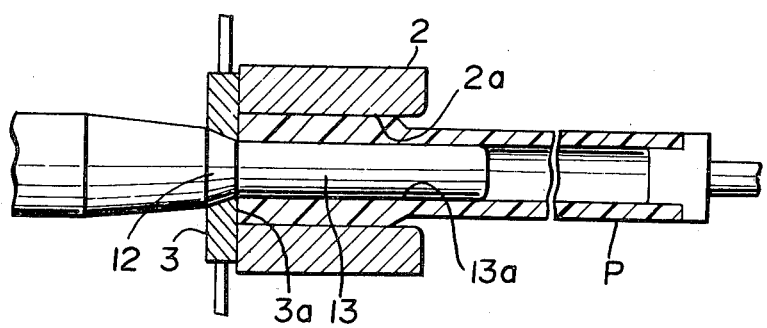

The order of the shifting of the resin tube P, the barrel (2) and the stopper (3) until reaching the condition of completing the thickness increasing work shown in FIG. 3, is not limited to said order and it can be modified in the range attaining the object of the thickness increasing work.

Figure 4:
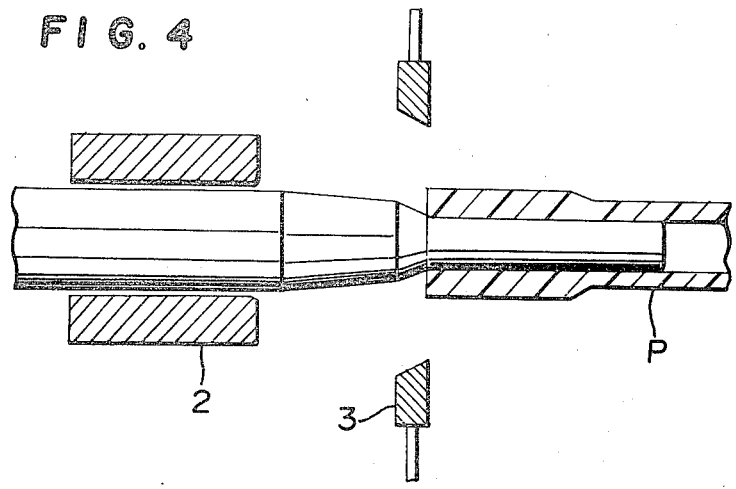

Then, the resin tube P is maintained for several seconds to several tens seconds in the condition shown in FIG. 3. The stopper (3) is outwardly opened to the radial direction of the male mold, and then, the barrel (2) is removed in the direction of the male mold large diameter part with a space formed between the male mold (1) and the stopper (3). The condition is shown in FIG. 4.

Figure 5:
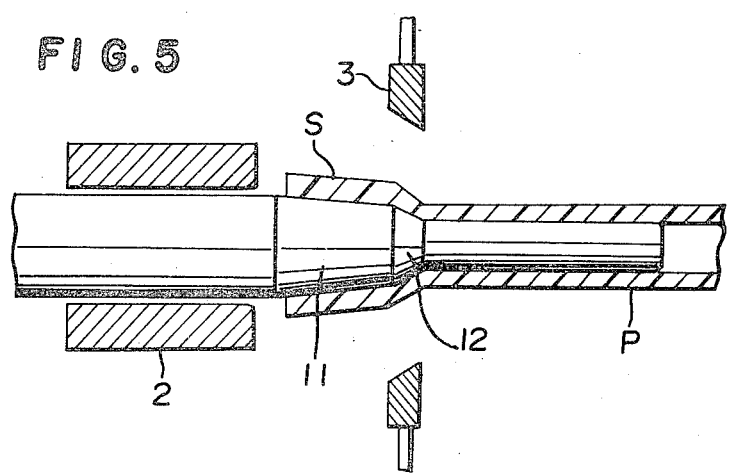

When the resin tube P is pushed in the direction of the male mold large diameter part (11) by the pushing device (4), the edge of the resin tube having the thickness increased part is outwardly fitted to the male mold large diameter part (11) through the male mold tapered part (12) whereby the diameter of the edge part is expanded to form the TS socket S having the inner tapered part corresponding to the male mold large diameter part (11). The condition is shown in FIG. 5.

Then, the shaped socket S is cooled with air etc. and then, the pushing device (4) is backwardly shifted to return the barrel (2) to the position shown in FIG. 2, whereby the edge surface of the socket S is pushed by the barrel (2) to take out the resin tube P from the male mold (1).

FIG. 8(c) is a sectional view of the resulting TS socket.

Figure 6:
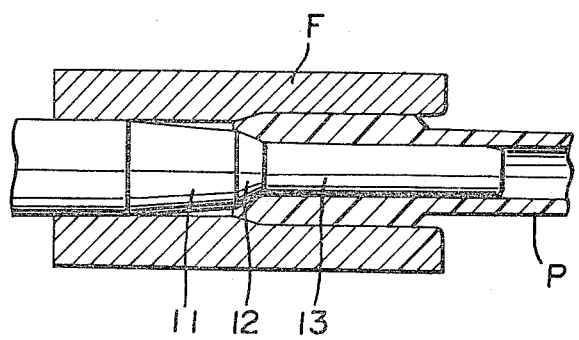
FIG. 6 is a sectional view for showing the reference method (at the finish of the thickness increasing work)

In the method of the present invention, the purposes of dividing the female mold into the barrel (2) and the stopper (3) are as follows. In the conventional thickness increasing work, one male mold and one female mold are used to push the resin tube between the male and female molds. When the conventional method is applied to the method of the present invention, the apparatus shown in FIG. 6 is used. (FIG. 6 shows the condition of the completion of the thickness increasing work).

In this case, a one piece female mold F is used. As shown in FIG. 6, it forms a tapered part (12) for the male mold whereby the end of the thickness increased part has sharp shape and the flat edge surface is not formed on the TS socket obtained by expanding the diameter. Accordingly, it is necessary to cut the edge of the socket and to process the edge so as to form flat surface after molding it.

On the contrary, in accordance with the method of the present invention, the socket having a flat edge surface can be obtained by the function of the stopper (3). The barrel (2) and the stopper (3) are separated whereby it is easy to prevent the movement of the barrel (2) by the stopper (3).

Referring to FIGS. 9 to 14, the other embodiment will be illustrated.

Figure 9:
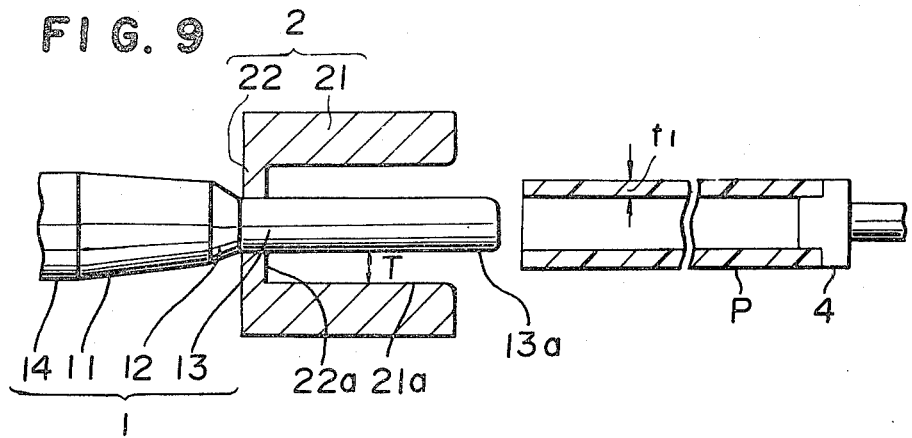
FIGS. 9 to 12 are sectional view for showing the other embodiment of the method of molding the TS socket according to the present invention.

FIG. 9 is a sectional view showing the condition of the socket when the method of the present invention is applied for the preparation of a TS socket.

In FIG. 9, a male mold (1) comprises the main parts of a large diameter part (11), a tapered part (12) and a small diameter part (13) which are held by a base (14) in one side. The small diameter part (13) is used to cause thickness increasing work and has a diameter substantially the same with the inner diameter of the resin tube P. The tapered part (12) and the large diameter part (11) are used to cause diameter expanding work. The tapered part (12) is used to smoothly expand the resin tube from the size of the small diameter part (13) to the size of the large diameter part (11). The large diameter part (11) is used to expand the diameter of the resin tube and has the outer shape corresponding to the inner surface shape of the TS socket S, that is, it has a slight tapered outer surface to the tapered part (12). The taper of the large diameter part is designed to be about 1/30 to 1/50 of the difference of diameters to length in accordance with the Standard for TS socket.

The female mold corresponding to the male mold (1) comprises a barrel (21) and the stopper (22).

The female mold controls the shape of the thickness increased part by surrounding the resin tube in the thickness increasing work on the male mold small diameter part (13). The barrel (21) controls the outer surface of the thickness increased part and the stopper (22) controls the edge surface thereof.

The female mold is a cylinder having its structure divided into several pieces in the radial direction. The gap between the inner surface (21a) of the barrel part and the outer surface (13a) of the male mold small diameter part is larger than the thickness $t_1$ of the resin tube P (such as 30% larger than $t_1$).

The stopper (22) has the stopper surface (22a) which is perpendicular to the inner surface (21a) of the barrel part whereby the stopper surface (22a) has the shape to close the opening of the annular space between the male mold small diameter part (13) and the female mold barrel part (21). That is, in the condition fastening the female mold (2) on the male mold (1) as shown in FIG. 9, the stopper surface (22a) is closely contacted with the boundary between the male mold tapered part (12) and the small diameter part (13) or on the small diameter part (13) near the boundary, and the stopper surface (22a) is substantially perpendicular to the axis of the male mold (1).

The inner surface of the stopper (22) (the part contacting with the male mold) is made of a soft material such as brass or bronze so as to prevent the damage of the male mold.

The female mold (2) can be fastened or opened to the inner or outer side in the radial direction of the male mold (1).

The pushing device (4) holds the worked resin tube P and pushes it toward the mold.

In the molding of the TS socket, the female mold (2) is fastened on the small diameter part (13). In the method, the female mold barrel (21) is disposed at outer part of the male mold small diameter part (13) and the outer stopper is contacted with the inner small diameter part (13).

Figure 10:
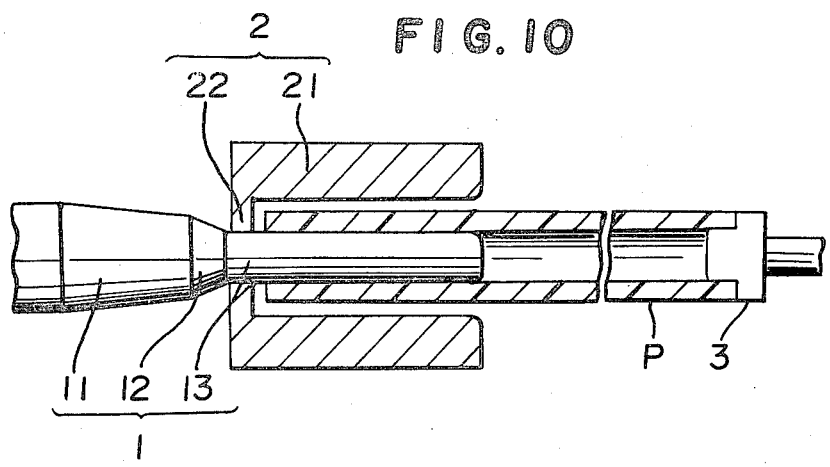

The edge of the resin tube P is heated to the temperature for softening the resin tube, for example about 120° C. in the case of rigid polyvinyl chloride, and the resin tube is outwardly fitted on the male mold small diameter part (13). The condition is shown in FIG. 10.

In the condition, the resin tube P is pushed toward the male mold large diameter part (11), whereby the edge of the resin tube P is filled in the annular space formed between the outer surface (13a) of the male mold small diameter part and the inner surface of the female mold. The condition is shown in FIG. 11.

The gap T between the outer surface (13a) of the male mold small diameter part and the inner surface (21a) of the barrel part is larger than the thickness $t_1$ of the resin tube P, whereby the thickness of the edge of the resin tube P is increased to T.

In the thickness increasing work, the male mold (1) and the female mold (2) are heated to a suitable temperature for example, 60° to 70° C. for the male mold and 90° to 100° C. for the female mold in the case of rigid polyvinyl chloride.

Figure 11:
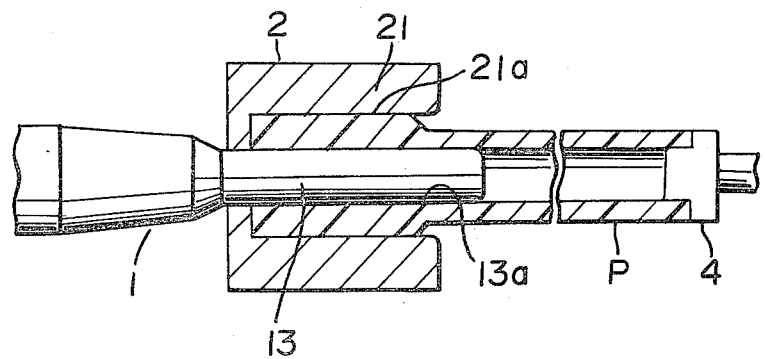
Figure 12:
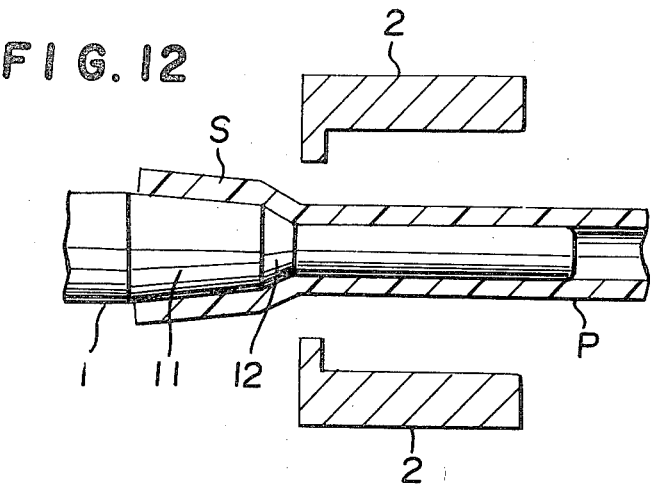

Then, the condition shown in FIG. 11 is maintained for several to several tens seconds, and the female mold (2) is opened to the outer radial direction of the male mold (1). The resin tube P is pushed into the male mold large diameter part (11) by the pushing device (4) and the edge of the resin tube having the thickness increased part is outwardly fitted on the male mold large diameter part (11) through the male mold tapered part (12), whereby the TS socket S having the tapered surface of the inner surface of the expanded part corresponding to the male mold large diameter part (11) is formed. The condition is shown in FIG. 12.

The molded socket S is cooled with air etc. and the pushing device (4) is backwardly shifted and the resin tube P is taken out from the male mold (1).

FIG. 8(c) is the sectional view of the resulting TS socket.

Figure 13:
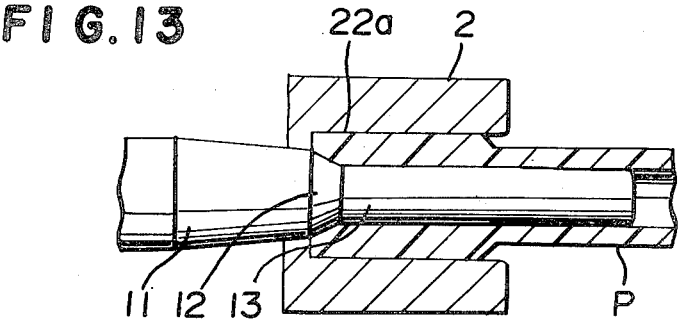
FIG. 13 is a sectional view for showing the reference method.

In the method of the present invention, it is necessary to dispose the stopper surface (22a) of the female mold at the boundary between the male mold tapered part (12) and the small diameter part (13) or near the boundary when the female mold (2) is fastened on the male mold (1). The reason is as follows. For example, as shown in FIG. 13 when the stopper surface (22a) of the female mold is disposed at the boundary between the male mold large diameter part (11) and the tapered part (12), as it is necessary to form the tapered part (12) on the male mold, the edge of the thickness increased part has sharp shape. The TS socket prepared by expanding the edge to the radial direction has not the flat edge surface, whereby it is necessary to cut the edge of the resin tube and to process it so as to form the flat surface after molding the TS socket.

The method of molding the TS socket has been illustrated. Thus, the method of the present invention can be applied for molding RR socket. FIG. 7 is a partially enlarged sectional view of one embodiment of the apparatus for molding the RR socket. The male mold large diameter part (11) does not have a taper and the mechanism for forming groove G is equipped in the male mold large diameter part (11).

The divided ring (5) can be enlarged or contracted in the radial direction of the male mold, and the slide means (6) having a conical shape is used for enlarging or contracting the divided ring (5).

As shown in FIG. 7(a), the edge of the resin tube P is outwardly fitted to the male mold large diameter part (11). In this condition, the outer surface of the divided ring (5) is substantially corresponded to the outer surface of the male mold large diameter part (11). When the slide means (6) is pushed in the position shown in FIG. 7(b), the divided ring (5) is enlarged whereby the edge of the resin tube P is outwardly expanded. The outer mold (7) is contacted with the expanded part whereby the RR socket having the groove G as shown in FIG. 8(b) can be molded.

The method of molding the groove G of the RR socket is not limited to said feature. It is also possible to form the groove G by various conventional methods (for example, a method of expanding the edge of the resin tube P until closely contacting it to the inner surface of the outer mold (7) by applying hydraulic fluid from the male mold in the condition disposing the outer mold (7).)

Figure 14:
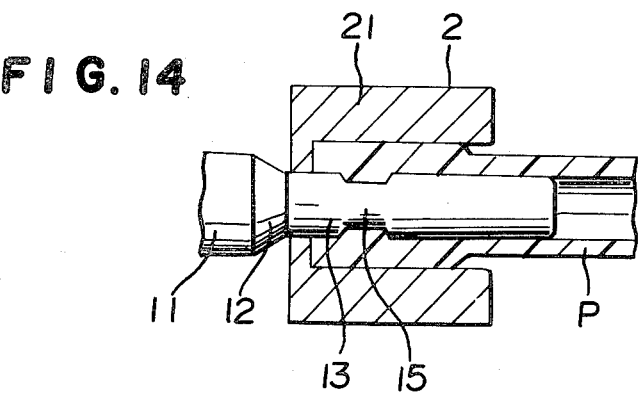
FIG. 14 is a sectional view for showing the other embodiment of the method of molding the RR socket according to the present invention.

FIG. 14 shows the other embodiment of the method of molding the RR socket, wherein a part having smaller diameter (15) is formed on the male mold small diameter part (13) (the diameter expanding part can be formed on the barrel (21) of the female mold (2)). The thickness of the part for forming the groove G at the edge of the resin tube P is further increased whereby the part for the groove G is effectively molded in suitable thickness.

In accordance with the present invention, the thickness of the edge of the resin tube P is previously increased and then, the diameter of the thickness increased part is expanded whereby the thickness $t_4$ of the socket can be the same as the thickness $t_1$ of the resin tube P or more.

Since the diameter expanding operation is carried out after increasing the thickness of the resin tube by pushing the edge of the molten resin tube, the socket having a predetermined size can be prepared by the diameter expanding operation even though the resin is not fully filled in the mold or the resin is contracted after filling it to be smaller than the space of the mold, in the thickness increasing operation.

The crease, wave or joint trace of the surface caused in the thickness increasing operation can be eliminated by the following diameter expanding operation. Smooth inner surface of the socket is formed during the sliding of the resin tube from the tapering part to the large diameter part to give high accuracy.

It is difficult to increase the thickness of the resin tube on the large diameter part (11) having the structure for forming the groove G in the case of the molding of the RR type socket. However, in accordance with the present invention, the thickness increased RR socket can be obtained without trouble.

In the first embodiment, the male mold and the barrel can be taken out from the same direction to the resin tube P whereby the removal of the molded product can be easily attained and this is advantageous in the continuous molding method. The edge of the molded socket can be flat in perpendicular to the axis of the resin tube whereby the post-treatment for forming flat surface is not required.

In the second embodiment which is optimum feature, the molding of sockets can be carried out under the continuous molding in high efficiency. As the apparatus, the thickness increasing operation is carried out in the condition that the female mold hold the male mold whereby the axis of the female mold is precisely conformed with the axis of the male mold and the resulting socket has uniform thickness and the operation of the apparatus can be smooth. These advantages are found.

Obviously, many modifications and variations of the present invention are possible in light of the above teachings. It is therefore to be understood that within the scope of the appended claims, the invention may be practiced otherwise than as specifically described herein.

What is claimed is:

1. A method for molding a socket end for a plastic tube comprising the steps of:
   heating the end of a resin tube to soften it;
   fitting said end axially upon the small diameter part of a male mold having a small diameter part, a tapered part and a large diameter part;
   surrounding said small diameter part of said male mold with a female mold consisting of a barrel having an inner surface spaced from the small diameter part by a distance greater than the thickness of the resin tube, and a stopper having an edge perpendicular to the axis of the resin tube which contacts the small diameter part of the male mold adjacent the boundary between the small diameter part and the tapered part;
   pushing the resin tube in the direction of said male mold large diameter part so that said resin tube abuts the perpendicular wall of said stopper and fills said space so as to form a thickened end portion having an edge perpendicular to the axis of the resin tube;
   removing said female mold from about said male mold; and
   pushing the resin tube in the direction of said male mold larger diameter part whereby the end of the resin tube having increased thickness is forced to expand and be fitted about said larger diameter part so as to form a socket end having a perpendicular edge and a thickness at least equal to that of the remainder of the resin tube.

2. A method of molding a socket of a plastic resin tube according to claim 1 wherein the edge of the resin tube is softened and inserted between said male mold and said female mold has stopper parts connected to said barrel parts in divided structure and said barrel and stopper are radially opened after molding.

3. A method of molding a socket of a plastic resin tube according to claim 1 wherein the edge of the resin tube is softened and inserted between said male mold and said female mold and said stopper in divided structure is divided to the radial direction after molding and said barrel is taken out to the direction of said male mold large diameter part.

4. A method of molding a socket of a plastic resin tube according to claim 1 wherein the edge of the resin tube is softened and inserted between said male mold, having a groove in radial direction, and said female mold.

* * * * *